INVENTOR
Ray D. Kell
BY [signature]
ATTORNEY

INVENTOR
Ray D. Kell
BY [signature]
ATTORNEY

INVENTOR
Roy D. Kell
BY [signature]
ATTORNEY

March 20, 1951 R. D. KELL 2,545,957

COLOR TELEVISION PICKUP SYSTEM

Filed Feb. 27, 1948 4 Sheets-Sheet 4

INVENTOR
Ray D. Kell
BY
ATTORNEY

Patented Mar. 20, 1951 2,545,957

UNITED STATES PATENT OFFICE 2,545,957

COLOR TELEVISION PICKUP SYSTEM

Ray D. Kell, Princeton, N. J., assignor to Radio Corporation of America, a corporation of Delaware Application February 27, 1948, Serial No. 11,742

8 Claims. (Cl. 178—5.4)

This invention relates to the pickup of television images in substantially their natural color and more particularly to methods and arrangements alleviating registry problems usually accompanying simultaneous type systems.

It is well known that the transmission of images by electricity can be accomplished by analyzing the image into its image elements and deriving therefrom by a predetermined orderly sequence of scanning a signal train of impulses representative of the highlights and shadows of the image. The image may then be reproduced at a remote location by employing the same sequence of scanning with a light producing element.

It is well known to the optical art that the reproduction of images in color may be accomplished by additive methods, that is, by dividing the light from an object into a predetermined number of selected primary or component colors which are three in number for a tricolor system, or, for a compromise degree of fidelity of color representation, even a bicolor system may be employed.

It follows, therefore, that color images may be transmitted by electricity by analyzing the light from the object into not only its image elements, but by also analyzing the light from elemental areas of the object into selected primary or component colors and deriving therefrom a signal train of impulses representative of each of the selected component colors. An image in substantially its natural color may then be reproduced at a remote location by appropriate reconstruction from the component color signal trains by the designated scanning action.

The transmission and reproduction of color images may be accomplished by either of two fundamental systems of multiple image transmission which have become identified as the "sequential" type system and the "simultaneous" type of color image transmission.

The sequential system transmits at any one time only one component color signal train and transmits a portion of each of the selected component color signal trains in predetermined sequence with other selected component color signal trains and preferably at a rapidly recurring rate.

The transmission by the so-called sequential process is usually accomplished through the use of moving color filters which are selected from the three primary or component colors which serve to provide the color separation when these color filters have been positioned in the optical path along which the image is directed to the transmitting camera and are changed from one to another color at a rapid rate. At the receiving location or locations, a similar set of filters to that of the transmitter is located in the optical path between the image reproducing tube and the observer. The filters of both the transmitter and receiver are mechanically driven to position like selected component colors in synchronism.

A typical sequential color type system is shown and described in an article entitled "An Experimental Color Television System," beginning on page 141 of the "RCA Review" for June, 1946.

The more popular sequential processes referred to above are necessarily limited in frequency to change of component color by reason of mechanical devices. For this reason, it is customary to employ a field sequential rate with the employment of mechanical filter changing arrangements.

Although color images have been reproduced by the aforementioned sequential method, by reason of overall system limitations there are certain fundamental difficulties involved which tend to reduce the entertainment value of the sequential system. Typical difficulties involved include color action fringes resulting from movement between individual component color scannings, color flicker, and the use of mechanically moving devices in the home receiver.

It will be seen that such difficulties as color action fringes and color flicker can be largely eliminated by employing a more rapid rate of change between selected component color images. This can be easily accomplished, but requires a greater band width for the transmission of the images. Because of necessary allotments of radio frequency spectrum, it is necessary to provide systems requiring a minimum frequency band width. Such a requirement, however, presents no difficulty when it is not intended that the signals be transmitted over the air or transmitted to a great number of receiving points for conversion into intelligence.

The simultaneous type system transmits all component color signal trains simultaneously through three separate signal channels.

A simultaneous all-electronic color television system has been proposed involving a cathode ray scanning tube which forms a scanning raster to be projected on a color film from which selected component color light sensitive devices transform the resultant light into several separate signal trains, each representative of a selected component color. A system of this nature is sometimes referred to as the "flying spot" system and is well shown and described in an article entitled "Simultaneous All-Electronic Color Television," beginning on page 459 of "RCA Review" for September, 1946. An improved color camera is shown and described in the co-pending U. S. application of Ray D. Kell and George C. Sziklai, Serial No. 716,256, filed December 19, 1946.

It will be seen, however, that the flying spot arrangement which is set forth for the conversion of planar color images to appropriate signal trains is not readily adaptable to studio pickup requirements where the object is three dimensional, and particularly when illumination is required at the position of the object for reading and the like, or when the scene to be transmitted includes important light sources.

There has also been proposed the employment of a color camera utilizing three complete and independent camera tubes, each of which separates from the light of the object being scanned a different selected component color image. Although satisfactory results can be obtained from such a system, the problem of registration of the several selected component color images is serious. The seriousness is, of course, aggravated when it is necessary that the television camera be made mobile or, where conditions do not permit, careful maintenance of proper adjustment.

According to the present invention, the advantages of both the sequential type arrangement and the simultaneous type arrangement are combined by utilizing both systems under preferred conditions to derive therefrom a simultaneous type signal which has been generally accepted as preferable.

According to this invention, a sequential type camera is employed at the image pickup location, and the sequential type signal is converted to the simultaneous type signal at a convenient location, such as the studio of the transmitting system. A simultaneous type signal is then transmitted to receiving locations.

Accordingly, a primary object of this invention is to provide an improved color television system.

Another object of this invention is to reduce the transmitting station problems relating to component color image registration.

Another object of the invention is to provide a lightweight portable television pickup camera in connection with a simultaneous type color television system.

Other and incidental objects of the invention will be apparent to those skilled in the art from a reading of the following specification and an inspection of the accompanying drawing in which.

Figure 3:
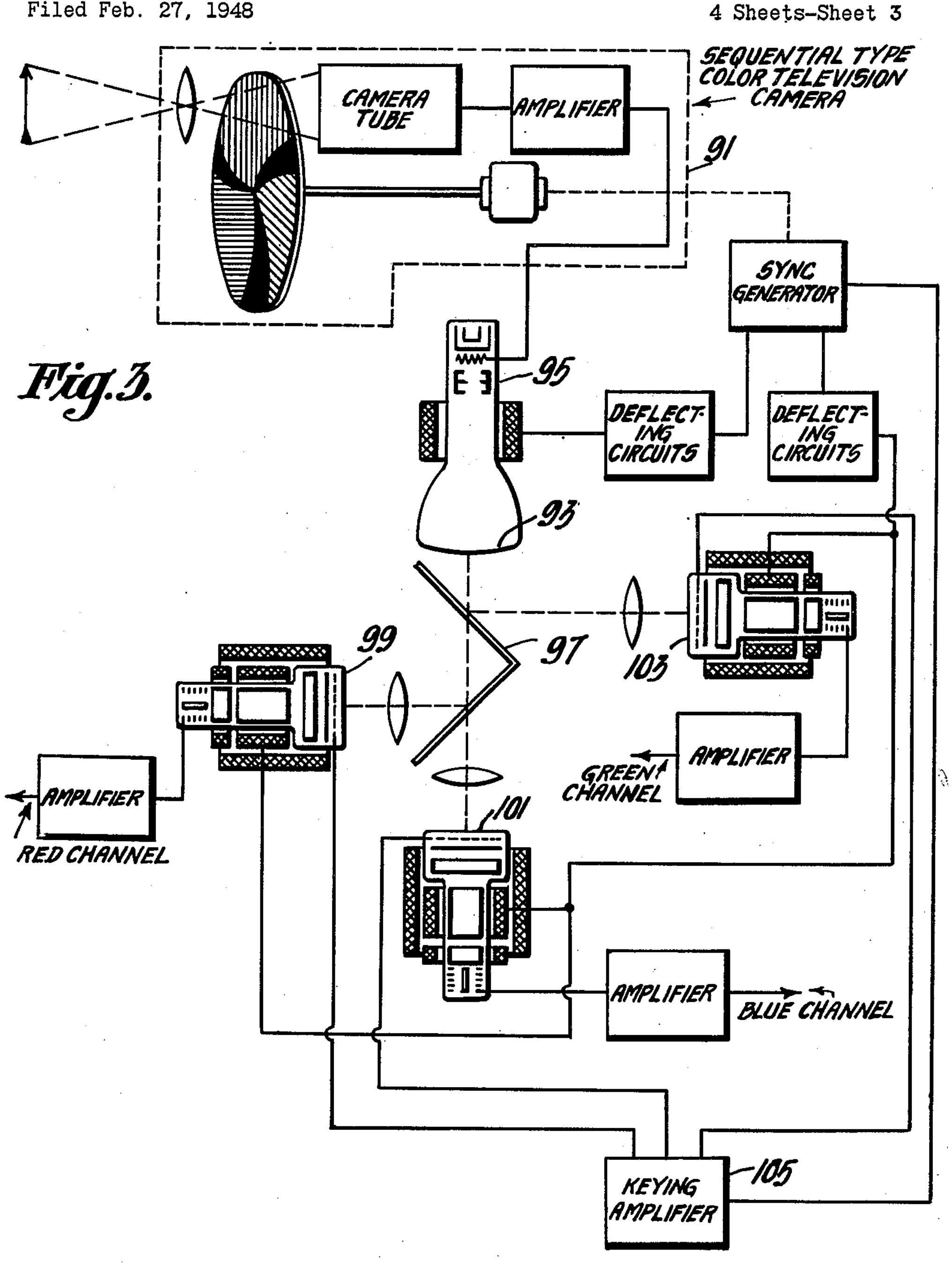

Figure 3 also shows by block diagram still another form of this invention; and

Figure 1:
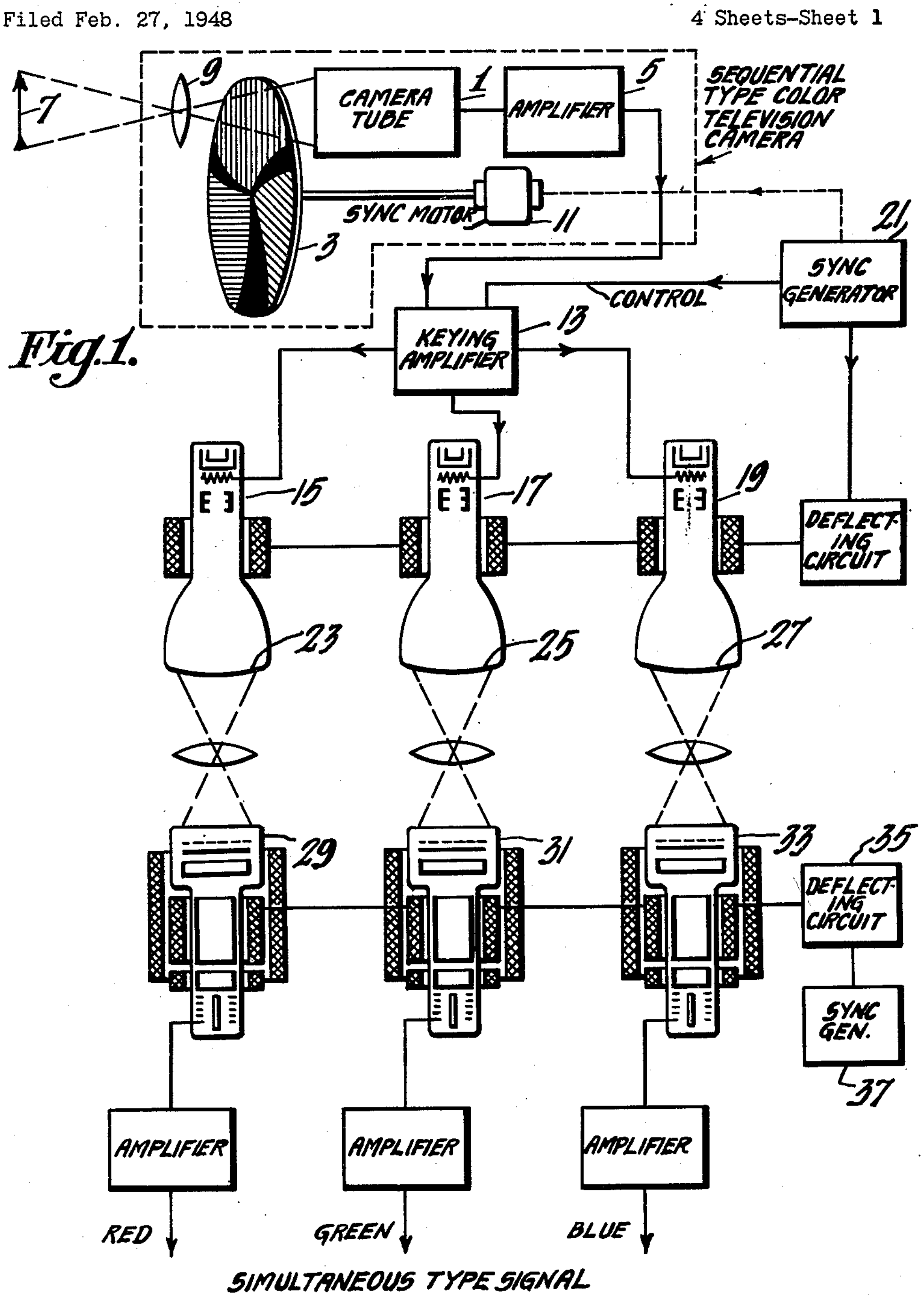
Figure 1 shows in block diagram one form of this invention.
Figure 4:
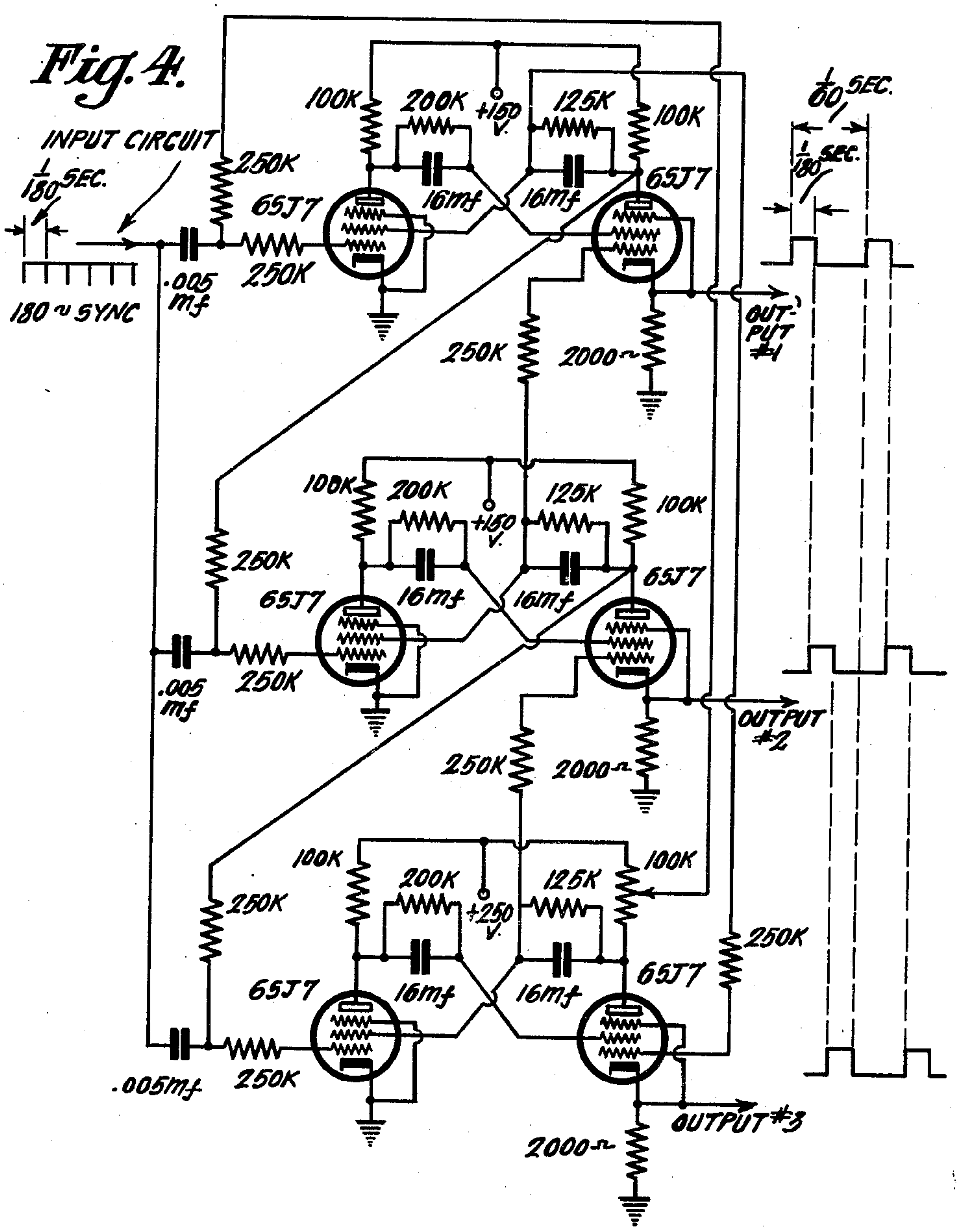

Figure 4 illustrates by circuit diagram a suitable keying amplifier required in the form of the invention shown in Figure 1.

Turning now in more detail to Figure 1, there is shown a sequential type camera involving the camera tube 1, the associated mechanical filter disk 3, and amplifier 5. Although the operation of a sequential type camera is well known and is adequately described in the published art, such as the article referred to above entitled "An Experimental Color Television System," it may be well at this point to describe briefly the conversion of color images into sequential type signals. Light from object 7 is focused on the camera tube 1 by the optical system 9. Interposed between the camera tube 1 and the object 7 there is positioned a color filter disk 3. Optical filter disk 3 is divided into three sections involving, for the purpose of illustration, red, green and blue sections. The filter disk 3 is revolved by motor 11 at a predetermined rate to produce in amplifier 5 a train of electrical signals which represent, during sequential time intervals, selected component color images.

The signal of the sequential type color television camera is transmitted to a keying amplifier 13, which operates synchronously to control image reproducing tubes 15, 17 and 19 in such a manner that each of the image reproducing tubes 15, 17 and 19 reproduces only one selected component color image. It will be seen that image reproducing tubes 15, 17 and 19 must operate in a sequential manner to properly reproduce the sequential type color television signal obtained from the sequential color television camera. Such operation is accomplished by furnishing tubes 15, 17 and 19 with signals only during the time which their respective designated color component image signal is in existence.

Although other suitable keying amplifiers may be employed, a typical circuit arrangement is illustrated in Figure 4 and will be described below.

The operation of the upper portion of the drawing including camera 1 and image reproducing tubes 15, 17 and 19 may be explained as follows.

At the time the camera tube 1 is receiving the red component color image by reason of the position of the filter disk 3, the keying amplifier 13 energizes only the image reproducing tube 15, which produces on its screen 23 a black and white image whose light intensity and detail are representative of, but not the color of, the red component of the object 7. Likewise, during the time interval that the camera tube 1 is receiving the green component color image as a result of the position of the rotating filter disk 3, a black and white image is formed on screen 25 of image reproducing tube 17, which is representative of the green component image taken from the object 7. Likewise, during the interval that the rotating filter disk 3 presents a blue filter between the camera tube 1 and the object 7, the tube 19 is sensitized by keying amplifier 13 to project a black and white image on its screen 27, which is representative of the blue component image.

Camera tubes 29, 31 and 33 are positioned to receive the images projected on screens 23, 25 and 27.

The image pickup tubes 29, 31 and 33 operate in the conventional manner and receive their deflection energy through deflecting circuit 35, which is controlled by the synchronizing pulse generator 37.

Synchronizing pulse generator 37 may provide the same rate of synchronization as sync generator 21. According to other forms of this invention, however, the sync generator 21 is completely independent of sync generator 37. Sync generator 37 must, however, provide the same synchronizing signals that are utilized in the receiving stations and therefore the synchronizing signals obtained from synchronizing generator 37 are employed in the radio transmission circuit.

It follows that camera tubes 29, 31 and 33 are operating simultaneously on the images produced on the screens 23, 25 and 27. If screens 23, 25 and 27 employ a certain amount of persistence, each of camera tubes 29, 31 and 33 will operate to produce the simultaneous type television signal, as indicated.

It will be seen, therefore, that, for convenience and compactness, the sequential type color television camera positioned at the top of the drawing may be employed at a remote or mobile position or may provide for extremely flexible studio pickup arrangements while the remaining part of the circuit can be located in a fixed position and carefully adjusted to maintain the registry between the several component color images. Another feature of this invention provides that the camera tubes 29, 31 and 33 may be positioned in such a manner as not to provide mutual interference by reason of stray magnetic fields caused by deflection or focusing field currents.

Figure 2:
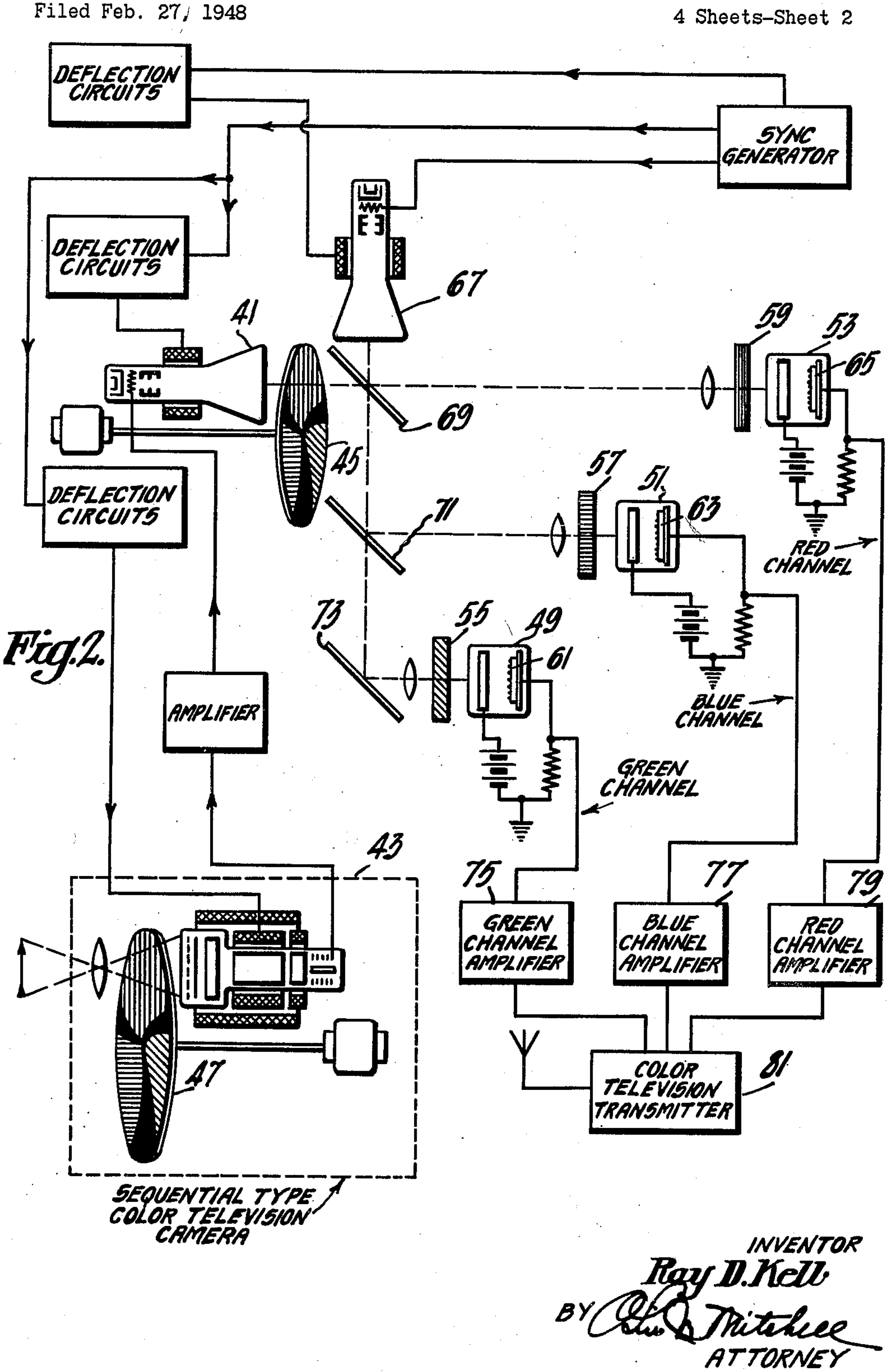
Figure 2 shows by block diagram another form of this invention.

Turning now to Figure 2, there is shown another form of this invention wherein a single image reproducing tube 41 is employed to produce sequentially black and white images representative of the light detail and intensity of the several component color images picked up sequentially in the sequential type camera 43. The sequential camera 43 may take the same form as the sequential type color television camera illustrated in Figure 1.

Rotating disk 45, which is operated in synchronism with rotating disk 47 of sequential camera 43, provides for the projection of component color images sequentially to image pickup tubes 49, 51 and 53, which include appropriate color filters 55, 57 and 59. Color filters 55, 57 and 59 correspond to the color filter sections of rotating color filter 45, which take the form, as illustrated, of red, blue and green component color filters.

It will be seen that tube 49 will receive only the green component color image, while tube 51 will receive only the blue component color image, and tube 53 will likewise receive only the red component color image.

Image pickup tubes 49, 51 and 53 are of a type shown and described in detail in the co-pending U. S. application of Paul K. Weimer, Serial No. 783,087, filed October 30, 1947. Although the operation of transmitter tubes 49, 51 and 53 is well shown and described in the co-pending application of Weimer referred to above, it may be well to briefly outline their operation in order that a clear understanding of the operation of this invention may be had.

The green component color image is focused on the mosaic electrode 61 of tube 49. The blue component color image is focused on the mosaic electrode 63 of tube 51, while the red component color image is focused on mosaic electrode 65 of tube 53. In accordance with the operating theory of cathode ray tubes employed for converting light images into electrical signals, it is necessary to employ a scanning agent. The scanning agent may take the form of an electron beam, or, in accordance with the invention of Weimer referred to above, it may take the form of a light spot which is caused to traverse the mosaic or target electrode in a normal scanning procedure. In the form of the invention shown in Figure 2, this is accomplished by the employment of a blank raster scanning tube 67, which forms a single scanning raster which is optically divided by partially reflective mirrors 69, 71 and 73. The scanning raster is divided in such a manner as to be in registry with each selected component color image on the target electrodes 61, 63 and 65. In accordance with the theory of operation of such elements, a signal is produced in the target electrodes 61, 63 and 65 representative of the green, blue and red selected component color images. These signal trains are then amplified in the usual manner in amplifiers 75, 77 and 79, to be transmitted through color television transmitter 81, which is of the simultaneous type.

Although the camera tubes 49, 51 and 53 receive their images from tube 41 in a sequential manner, the scanning operation resulting from the scanning raster of tube 67 causes substantially simultaneous type signals to be derived from their target electrodes. This is because a certain amount of image persistence exists in camera tubes 49, 51 and 53, that is, the scanning operation resulting from the raster of scanning tube 67 does not completely eliminate the image laid down by the image producing tube 41. The kinescope screen 41 may also furnish some persistence by properly selecting the phosphor. It therefore follows that a simultaneous type signal is provided for color television transmitter 81.

Turning now to Figure 3, there is shown another form of this invention which involves the sequential camera 91, which develops on the screen 93 of image reproducing tube 95 a series of black and white images sequentially representative of the selected component color images of the sequential type camera 91. The black and white images produced on tube 95 are projected by suitable light dividing means, such as the partially reflective mirrors 97, to the simultaneous type camera tubes 99, 101 and 103.

It will be seen, however, that each of camera tubes 99, 101 and 103 will receive as black and white images all of the component color images in sequence. There must, therefore, be provided a switching arrangement to actuate cameras 99, 101 and 103 sequentially in order to properly identify the black and white image projected thereon which is properly color designated.

This may be accomplished by causing camera tubes 99, 101 and 103 to become operative only during the sequential time periods, at which time is properly designated component color image representation is present on the screen 93 of image reproducing tube 95. Such an arrangement would, however, provide interrupted simultaneous type signals in the indicated red, blue and green channels. In accordance with one form of the invention, however, the keying amplifier 105 operates to key the image sections of the camera tubes 99, 101 and 103 to provide operation for the image sections of the camera tubes only during the interval of time designated for the respective color component image. In accordance with the operation of the image orthicon, which is well shown and described in an article entitled "The Image Orthicon, A Sensitive Television Pickup Tube," in the "Proceedings of the Institute of Radio Engineers" for July, 1946, the image section may be keyed into operation only during predetermined intervals, while the scanning operation of the orthicon section may be continuous. This may be accomplished by an auxiliary charge on the photo cathode of the image section of the tube. It follows, therefore, that due to the residual charge on the target of the orthicon section of the camera tube, a substantially continuous signal may be obtained, even through the image section of the tube provides image information only a part of the time. The scanning of the target of the orthicon section does not remove completely the image information, but subsequent scannings may derive signal energy therefrom. In this manner, a sequential type signal is produced in the red, blue and green channels, as indicated.

Turning now in detail to Figure 4, there is illustrated a suitable keying amplifier capable of producing the desired keying signal necessary for operation of this invention in the forms illustrated. For example, a 180 cycle synchronizing signal is applied to the input circuit. The circuit arrangement shown in Figure 4, which is popularly known as the ring frequency divider, produces in its output circuits, as indicated, a series of pulses which are out of phase with each other to produce sequential switching.

The operation of the ring frequency divider, as illustrated in Figure 4, is well known in the art and needs no further description here. The output signal of the ring frequency divider, as indicated on the right-hand side of Figure 4, provides three recurring sets of pulses, each 1/180 second in duration and spaced 1/60 second. It will be seen, therefore, that the pulses obtained from the frequency divider of Figure 4 may be employed to control the components of the forms of the invention shown in Figures 1 and 3. A circuit arrangement for producing the same result in a different manner is shown and described, for example, in U. S. patent application of Somers, Serial No. 417,295, filed October 31, 1941, now Patent No. 2,505,589, issued April 25, 1950.

It will be seen that the above explanation of the invention in several of its forms will permit the use of a sequential type color television camera for picking up image signals and the employment of image reproducing devices, together with simultaneous type color television cameras for transmission of the signals in the simultaneous manner.

Having thus described the invention, what is claimed is:

1. A simultaneous type color television image pickup system comprising in combination a sequential type color television image pickup camera having a single image pickup tube, an optical device for projecting on said image pickup tube a single selected component color image at any one time and sequentially with other selected component color images, a television image reproducing equipment electrically connected to said camera for simultaneously reproducing all of said selected component color images, means including a separate television camera tube for each of said reproduced selected component color images to produce simultaneous type color television signals, and an optical system to project said reproduced component color images upon said separate television camera tubes.

2. A simultaneous type color television image pickup system comprising in combination a sequential type color television image pickup camera having a single image pickup tube, an optical device for projecting on said image pickup tube a single selected component color image at any one time and sequentially with other selected component color images, a television image reproducing equipment electrically connected to said camera for simultaneously reproducing each of said selected component color images separately, means including a separate television camera tube for each of said reproduced selected component color images to produce simultaneous type color television signals, and an optical system to project said reproduced component color images upon said separate television camera tubes.

3. A simultaneous type color television image pickup system comprising in combination a sequential type color television image pickup camera having a single image pickup tube, an optical device for projecting on said image pickup tube a single selected component color image at any one time and sequentially with other selected component color images, a television image reproducing equipment electrically connected to said camera for sequentially reproducing each of said selected component color images wherein said component color images are simultaneously present on said image reproducing equipment, means including a separate television camera tube for each of said reproduced selected component color images to produce simultaneous type color television signals, and an optical system to project said reproduced component color images upon said separate television camera tubes.

4. A simultaneous type color television image pickup system comprising in combination a sequential type color television image pickup camera having a single image pickup tube, an optical device for projecting on said image pickup tube a single selected component color image at any one time and sequentially with other selected component color images, a television image reproducing equipment electrically connected to said camera for sequentially in registry reproducing each of said selected component color images wherein said component color images are simultaneously present on said image reproducing equipment, means including a separate television camera tube for each of said reproduced selected component color images to produce simultaneous type color television signals, and an optical system to project said reproduced component color images upon said separate television camera tubes.

5. A simultaneous type color television image pickup system comprising in combination a sequential type color television image pickup camera having a single image pickup tube, an optical device for projecting on said image pickup tube a single selected component color image at any one time and sequentially with other selected component color images, a television image reproducing equipment electrically connected to said camera for simultaneously reproducing each of said selected component color images, means including a separate television camera tube for each of said reproduced selected component color images to produce simultaneous type color television signals, and an optical system to direct each reproduced selected component color image to its color designated camera tube.

6. A simultaneous type color television image pickup system comprising in combination a sequential type color television image pickup camera having a single image pickup tube, an optical device for projecting on said image pickup tube a single selected component color image at any one time and sequentially with other selected component color images, a television image reproducing equipment electrically connected to said camera for simultaneously reproducing each of said selected component color images, means including a separate television camera tube for each of said reproduced selected component color images to produce simultaneous type color television signals, and a color filter system to direct each reproduced selected component color image to its color designated camera tube.

7. A simultaneous type color television image pickup system comprising in combination a sequential type color television image pickup camera having a single image pickup tube, an optical device for projecting on said image pickup tube a single selected component color image at any one time and sequentially with other selected component color images, a television image reproducing equipment electrically connected to said camera for simultaneously generating light representative of each of said selected component color images, means including a separate television camera tube for each of said reproduced selected component color images to produce simultaneous type color television signals, and a color filter system to direct the light representative of each selected component color image to its designated camera tube.

8. A simultaneous type color television image pickup system comprising in combination a sequential type color television image pickup camera having a single image pickup tube, an optical device for projecting on said image pickup tube a single selected component color image at any one time and sequentially with other selected component color images, a television image reproducing equipment electrically connected to said camera for simultaneously generating light representative of each of said selected component color images, means including a separate television camera tube for each of said reproduced selected component color images to produce simultaneous type color television signals, and an optical system positioned between said camera tubes for passing light only during the time said sequential type color television image pickup camera is producing the component color image to which the associated camera tube is designated.

RAY D. KELL.

REFERENCES CITED

The following references are of record in the file of this patent:

UNITED STATES PATENTS

| Number | Name | Date |
|---|---|---|
| 2,253,292 | Goldsmith | Aug. 19, 1941 |
| 2,309,506 | Herbst | Jan. 26, 1943 |
| 2,335,180 | Goldsmith | Nov. 23, 1943 |